United States Patent
Li et al.

(10) Patent No.: US 11,373,185 B2
(45) Date of Patent: Jun. 28, 2022

(54) TRANSACTION WITH SECURITY INTEGRITY AND PERMISSION MANAGEMENT

(71) Applicant: INTERNATIONAL BUSINESS MACHINES CORPORATION, Armonk, NY (US)

(72) Inventors: Jialin Li, Westford, MA (US); Pradeep K. Nanjundaswamy, Bangalore (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 1361 days.

(21) Appl. No.: 15/236,073

(22) Filed: Aug. 12, 2016

(65) Prior Publication Data
US 2018/0047017 A1   Feb. 15, 2018

(51) Int. Cl.
| | |
|---|---|
| G06Q 20/38 | (2012.01) |
| G06Q 20/40 | (2012.01) |
| G06Q 20/42 | (2012.01) |
| G06Q 30/06 | (2012.01) |
| G06Q 20/22 | (2012.01) |

(52) U.S. Cl.
CPC ..... G06Q 20/4014 (2013.01); G06Q 20/2295 (2020.05); G06Q 20/405 (2013.01); G06Q 20/42 (2013.01); G06Q 30/0601 (2013.01)

(58) Field of Classification Search
CPC .................................................. G06Q 20/363
USPC ......................................................... 705/26
See application file for complete search history.

(56) References Cited

U.S. PATENT DOCUMENTS

| | | | |
|---|---|---|---|
| 7,624,039 B2 | 11/2009 | Sherwin et al. | |
| 7,783,522 B2 | 8/2010 | Sattler et al. | |
| 9,450,958 B1* | 9/2016 | Saylor | H04L 63/102 |
| 10,237,278 B1* | 3/2019 | Saylor | H04L 63/102 |
| 2002/0052801 A1 | 5/2002 | Norton et al. | |
| 2012/0317624 A1* | 12/2012 | Monjas Llorente | H04L 63/105 726/4 |
| 2013/0262253 A1 | 10/2013 | Shih | |
| 2013/0317976 A1 | 11/2013 | Oh et al. | |
| 2013/0325663 A1 | 12/2013 | Scipioni et al. | |

(Continued)

OTHER PUBLICATIONS

Peter Mell et al., "The NIST Definition of Cloud Computing", National Institute of Standards and Technology, U.S. Department of Commerce, NIST Special Publication 800-145, Sep. 2011, 7 pages.

(Continued)

Primary Examiner — Chinedu C Agwumezie
(74) Attorney, Agent, or Firm — Stephanie Carusillo; George S. Blasiak; Heslin Rothenberg Farley & Mesiti PC

(57) ABSTRACT

Methods, computer program products, and systems are presented and can include for instance: The method can include for example, establishing a permission that authorizes a second shopper to act on behalf of a first shopper, the first shopper having a profile that includes first shopper information stored in a secure computing environment; and performing a transaction based on one or more input of the second shopper, the transaction using content of the first shopper information stored in a secure computing environment, wherein the second shopper is restricted from accessing one or more information item of the first shopper information stored in a secure computing environment.

20 Claims, 9 Drawing Sheets

(56) References Cited

U.S. PATENT DOCUMENTS

| | | |
|---|---|---|
| 2014/0172634 A1 | 6/2014 | Dogin et al. |
| 2014/0258010 A1* | 9/2014 | Mardikar ............. G06Q 20/202 |
| | | 705/21 |
| 2014/0297466 A1 | 10/2014 | Bernshteyn et al. |
| 2015/0012384 A1 | 1/2015 | Bank et al. |
| 2015/0142591 A1 | 5/2015 | High et al. |
| 2015/0213443 A1* | 7/2015 | Geffon .................. G06Q 20/40 |
| | | 705/76 |
| 2015/0242764 A1 | 8/2015 | Subbaraj |
| 2016/0117758 A1 | 4/2016 | Bleakley et al. |

OTHER PUBLICATIONS

Brown et al., "Intelligent Agent Based Mobile Shopper", IEEE, IFIP International Conference on Wireless and Optical Communications Networks, Apr. 28-30, 2009, pp. 1-7.

"Integration Based Large Scale Broker's Resource Management on Friendly Shopping Application in Dynamic Grid Computing", IEEE, Fourth International Conference on Advanced Computing, ICoAC, Chennai, India, Dec. 13-15, 2012, 6-pages.

* cited by examiner

TRANSACTION WITH SECURITY INTEGRITY AND PERMISSION MANAGEMENT

TECHNICAL FIELD

The present disclosure in the field of computer security relates to a transaction with security integrity that uses a permission to perform a transaction without compromising secure content of computer files.

BACKGROUND

As transacting parties adopt online payment systems, they need to ensure their transactions are secure. Identification verification methods can include a knowledge factor (i.e., something only the user knows, such as a password).

Electronic resources like software applications, databases, documents or electronic pictures stored within a software application container being accessible via a computer network are generally protected and user access requires some sort of authentication. However, such electronic resources stored within a protected and/or public data environment frequently contain information that should be available publicly, which means that access to these data should not require authentication.

In the state of the art, different techniques are well-known for providing user access to public and protected electronic resources, whereby protected resources can only be accessed by authorized users using a controlled access system. Authorization is commonly based on identification and authentication, wherein identification is a process that enables recognition of an entity by a system, and authentication is a process that verifies the identity of a user, device or other entity in a computer system, usually as a prerequisite to allow access to a resource in a computer system. In general, a realm is defined on a web or application server. Such a realm contains a collection of users, which may or may not be assigned to a group, that are controlled by the same authentication policy. A software or web application will often prompt a user to name a password for allowing access to protected resources. When the user has entered the user name and the password, the information is transmitted to the server, which either authenticates the user and sends the protected resource or fails to authenticate the user, in which case access to a protected resource is denied. Thereby, different access control strategies are well-known, which can be divided into discretionary access control (DAC), mandatory access control (MAC), multi-level/multi-lateral security methods and role-based access control (RBAC).

The DAC represents one of the most common access control strategies. This function is often referred to as identity-based access control (IBAC). An access to an electronic resource is based on the identity of the user (human user, process, system), whereby access control rights are defined individually from the user himself/herself and for each user individually. In contrast thereto, MAC grants access to electronic resources according to rules and properties of the user and the electronic resource. Therefore, the user is not capable of directly accessing an electronic resource and is required to use a reference monitor. This access control strategy is also referred to as rule-set-based access control. A multi-level security system is highly similar to a mandatory access control system and comprises several cascaded protection levels, which distinguish between a top-down and a bottom-up information flow. A multi-lateral security access model represents an enhanced access control strategy, which does not only consider top-down and bottom-up information flow, but also considers all sides of information access.

In computer system security, a role-based access control (RBAC) represents an approach to restrict system access to authorized users, which constitutes a more recent alternative approach to MAC and discretionary access control (DAC). Roles are created for various job functions defining electronic resource access properties, thus certain operations are assigned to specific roles. Groups of users are assigned to particular roles and those role assignments require the permission to perform particular system functions. Since users are not assigned permissions directly, but only acquire them by means of their role, management of individual user rights can be performed centrally, whereby references from one electronic resource to another one are handled by a role mechanism.

SUMMARY

The shortcomings of the prior art are overcome, and additional advantages are provided, through the provision, in one aspect, of a method. The method can include for example, establishing, by one or more processor, a permission that authorizes a second shopper to act on behalf of a first shopper, the first shopper having a profile that includes first shopper information stored in a secure computing environment; and performing, by the one or more processor, a transaction based on one or more input of the second shopper, the transaction using content of the first shopper information stored in a secure computing environment, wherein the second shopper is restricted from accessing one or more information item of the first shopper information stored in a secure computing environment.

In another aspect, a computer program product can be provided. The computer program product can include a computer readable storage medium readable by one or more processing unit and storing instructions for execution by one or more processor for performing a method. The method can include for example, establishing a permission that authorizes a second shopper to act on behalf of a first shopper, the first shopper having a profile that includes first shopper information stored in a secure computing environment; and performing a transaction based on one or more input of the second shopper, the transaction using content of the first shopper information stored in a secure computing environment, wherein the second shopper is restricted from accessing one or more information item of the first shopper information stored in a secure computing environment.

In a further aspect, a system can be provided. The system can include, for example a memory. In addition, the system can include one or more processor in communication with the memory. Further, the system can include program instructions executable by the one or more processor via the memory to perform a method. The method can include for example, establishing a permission that authorizes a second shopper to act on behalf of a first shopper, the first shopper having a profile that includes first shopper information stored in a secure computing environment; and performing a transaction based on one or more input of the second shopper, the transaction using content of the first shopper information stored in a secure computing environment, wherein the second shopper is restricted from accessing one or more information item of the first shopper information stored in a secure computing environment.

Additional features and advantages are realized through the techniques set forth herein. Other embodiments and aspects are described in detail herein and are considered a part of the claimed invention.

BRIEF DESCRIPTION OF THE DRAWINGS

One or more aspects of the present invention are particularly pointed out and distinctly claimed as examples in the claims at the conclusion of the specification. The foregoing and other objects, features, and advantages of the invention are apparent from the following detailed description taken in conjunction with the accompanying drawings in which:

DETAILED DESCRIPTION

Figure 1:
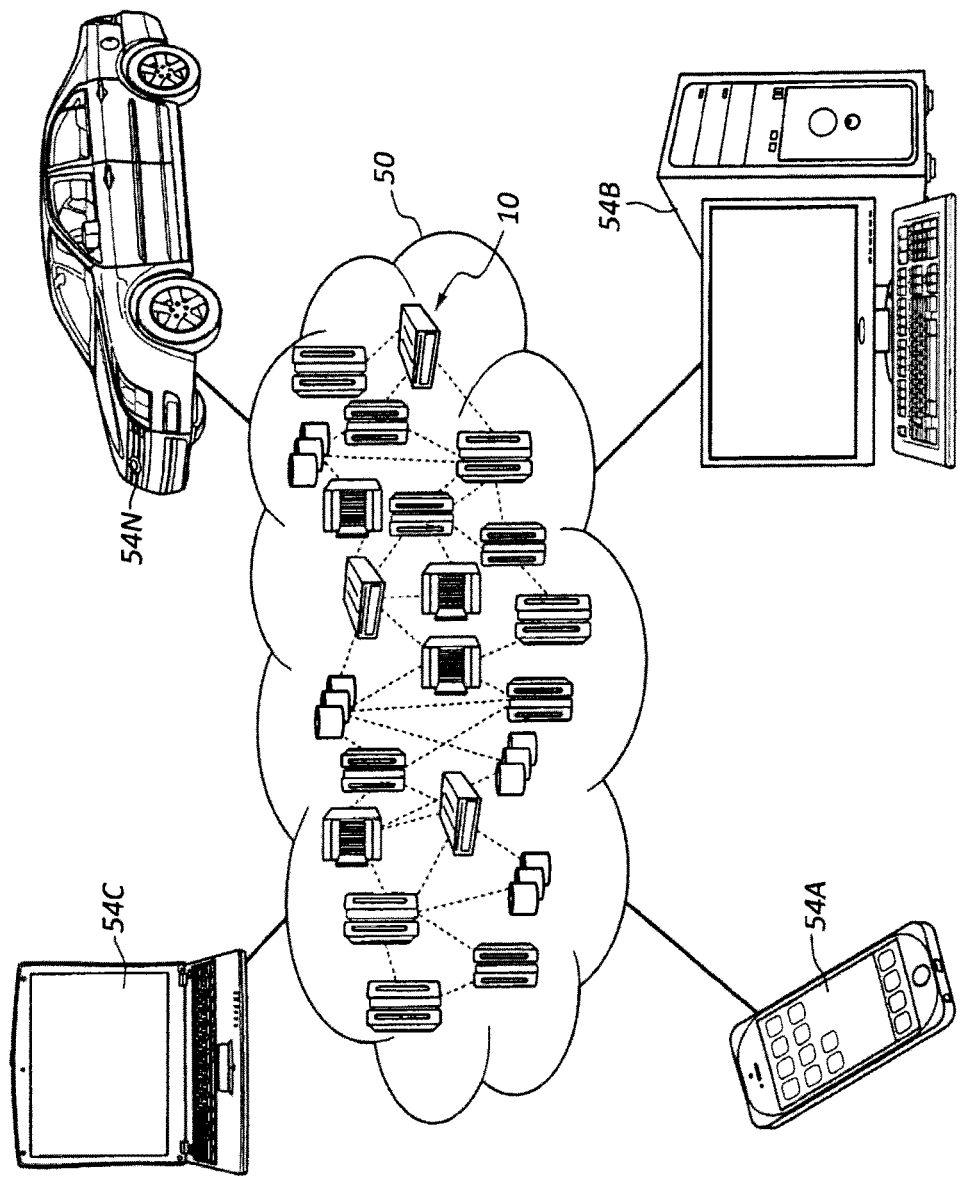
FIG. 1 depicts a cloud computing environment according to an embodiment as set forth herein.

Aspects of the present disclosure and certain features, advantages, and details thereof, are explained more fully below with reference to the non-limiting examples illustrated in the accompanying drawings. Descriptions of well-known materials, processing techniques, etc., are omitted so as not to unnecessarily obscure the disclosure in detail. It should be understood, however, that the detailed description and the specific examples, while indicating aspects of the invention, are given by way of illustration only, and not by way of limitation. Various substitutions, modifications, additions, and/or arrangements, within the spirit and/or scope of the underlying inventive concepts will be apparent to those skilled in the art from this disclosure.

Advantageously, the techniques disclosed herein allow for improved processing of transactions involving a first shopper wherein a first shopper grants permission to a second shopper to act on behalf of the first shopper. A method can include, for example, establishing a permission that authorizes a second shopper to act on behalf of a first shopper, the first shopper having a profile that includes first shopper information stored in a secure computing environment; and performing a transaction based on one or more input of the second shopper, the transaction using content of the first shopper information stored in a secure computing environment, wherein the second shopper is restricted from accessing one or more information item of the first shopper information stored in a secure computing environment.

Embodiments herein employ and improve computer technologies for use by one or more online shoppers. In various embodiments, a secure computing environment is used in the performing of a transaction. In various embodiments, an online merchant system with increased processing resources relative to a shopper device can be employed to mediate communications between a first shopper and a second shopper. In various embodiments, an online merchant system with increased processing resources relative to a shopper device can provide a secure communication channel for communications between a first shopper device and the online merchant system, between a second shopper device and the online merchant system, and between a first shopper device and a second shopper device as mediated by the online merchant system. In various embodiments, an online merchant system with increased processing resources relative to a shopper device can be employed to provide a variety of security functions, including secure communications, secure token generation, and protection of confidential profile information while mediating permissions allowing restricted access to such confidential profile information. One or more digital rights allocation can be performed based on a permission request obtained from a first shopper.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
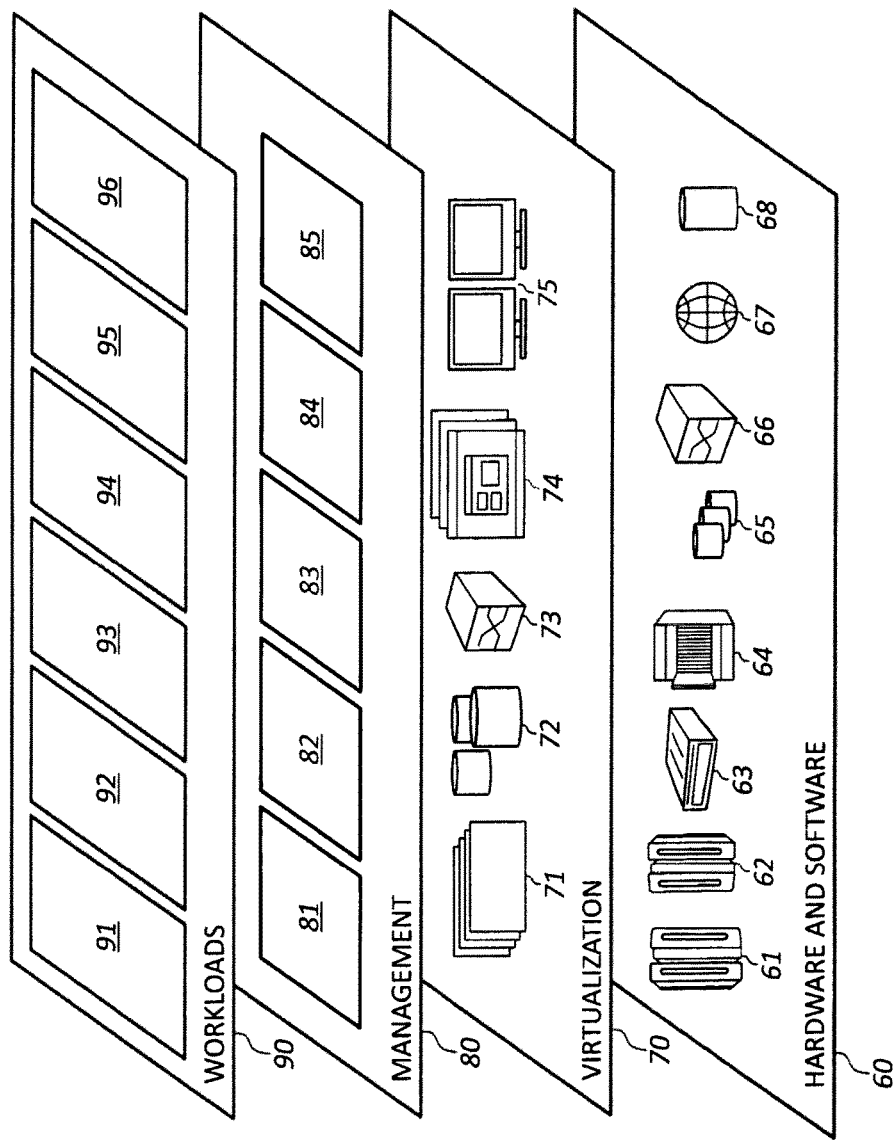
FIG. 2 depicts abstraction model layers according to an embodiment as set forth herein.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and first shopper to second shopper permission processing 96.

Figure 3:
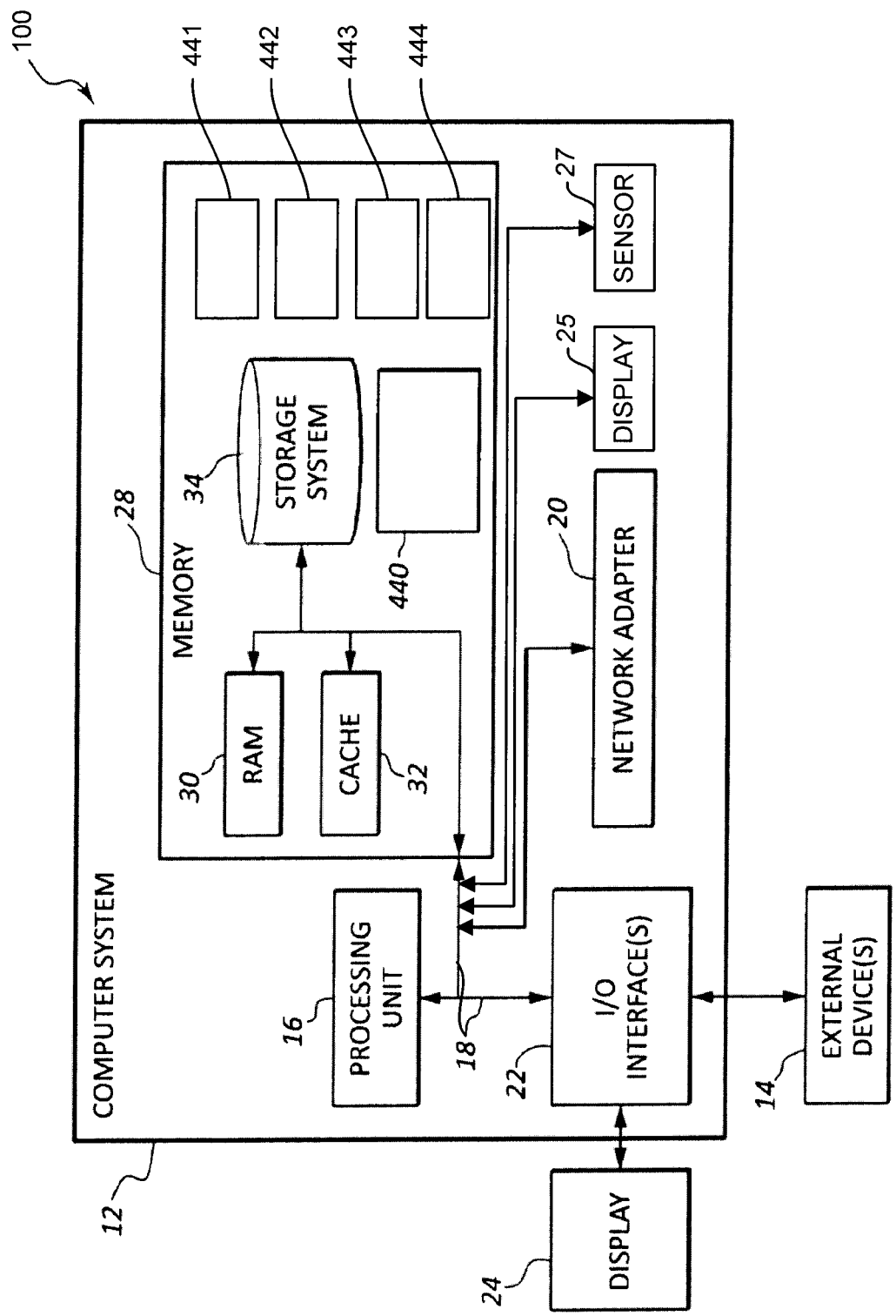
FIG. 3 depicts a hardware overview of a computing node, in accordance with an embodiment as set forth herein.

Referring now to FIG. 3, FIG. 3 depicts a hardware overview of a computing node 100, in accordance with an embodiment set forth herein. Computing node 100 is only one example of a suitable computing node and is not intended to suggest any limitation as to the scope of use or functionality of embodiments of the invention described herein. Regardless, computing node 100 is capable of being implemented and/or performing any of the functionality set forth hereinabove.

In one embodiment, computing node 100 can be provided as a cloud computing node 10 of a cloud computing environment 50 as set forth in reference to FIG. 1. In one embodiment, computing node 100 can be provided as a computing node of a computing environment other than a cloud computing environment.

In computing node 100 there can be provided a computer system 12, which is operational with numerous other general purpose or special purpose computing system environments or configurations. Examples of well-known computing systems, environments, and/or configurations that may be suitable for use with computer system 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system 12 may be described in the general context of computer system-executable instructions, such as program modules, being executed by a computer system. Generally, program modules may include routines, programs, objects, components, logic, data structures, and so on that perform particular tasks or implement particular abstract data types. Computer system 12 may be practiced in distributed cloud computing environments where tasks are performed by remote processing devices that are linked through a communications network. In a distributed cloud computing environment, program modules may be located in both local and remote computer system storage media including memory storage devices. Computer system 12 may be practiced in a non-distributed and/or non-cloud environment.

As shown in FIG. 3, computer system 12 in computing node 100 is shown in the form of a general-purpose computing device. The components of computer system 12 may include, but are not limited to, one or more processor 16, a system memory 28, and a bus 18 that couples various system components including system memory 28 to one or more processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system 12 typically includes a variety of computer system readable media. Such media may be any available media that is accessible by computer system 12, and it includes both volatile and non-volatile media, removable and non-removable media.

System memory 28 can include computer system readable media in the form of volatile memory, such as random access memory (RAM) 30 and/or cache memory 32. Computer system 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one or more program (e.g., one or more program 440 and/or one or more program 441, 442, 443, 444 as set forth herein) configured to carry out the functions of embodiments of the invention.

One or more program 440 having a set (at least one) of program modules, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. In place of or in addition to one or more program 440 memory 28 can store one or more additional one or more program, e.g., one or more program 441, 442, 443, 444. Computer system 12 may also communicate with one or more external devices 14 such as a keyboard, a pointing device, a display 24, etc. that enable a user to interact with computer system 12; and/or any devices (e.g., network card, modem, etc.) that enable computer system 12 to communicate with one or more other computing devices. Such communication can occur via Input/Output (I/O) interfaces 22. Still yet, computer system 12 can communicate with one or more networks such as a local area network (LAN), a general wide area network (WAN), and/or a public network (e.g., the Internet) via network adapter 20. As depicted, network adapter 20 communicates with the other components of computer system 12 via bus 18. It should be understood that although not shown, other hardware and/or software components could be used in conjunction with computer system 12. Examples include, but are not limited to: microcode, device vehicle operators, redundant processing units, external disk drive arrays, RAID systems, tape drives, and data archival storage systems, etc. In addition to or in place of having external devices 14 and display 24, which can be configured to provide user interface functionality, computing node 100 in one embodiment can include display 25 connected to bus 18. In one embodiment, display 25 can be configured as a touch screen display and can be configured to provide user interface functionality. Computer system 12 in one embodiment can also include one or more sensor device 27 connected to bus 18. One or more sensor device 27 can alternatively be connected through I/O interface(s) 22. One or more sensor device 27 can include a Global Positioning Sensor (GPS) device in one embodiment and can be configured to provide a location of computing node 100.

A representative one or more program of one or more program 440, 441, 442, 443, 444 can have a set (at least one) of program modules, and may be stored in memory 28 by way of example, and not limitation, as well as an operating system, one or more application programs, other program modules, and program data. Each of the operating system, one or more application programs, other program modules, program data, and one or more program, or some combination thereof, may include an implementation of a networking environment. One or more program 440 (and optionally at least one program of one or more program 441, 442, 443, 444) can generally carry out the functions and/or methodologies of embodiments of the invention as described herein. One or more program 440 (and optionally at least one program of one or more program 441, 442, 443, 444) can include computer readable program instructions as are set forth herein that can be stored in a computer readable storage medium within a respective computing/processing device. In one embodiment a computer readable storage medium as set forth herein can be included in memory 28 as set forth in FIG. 3.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the figures for example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 4:
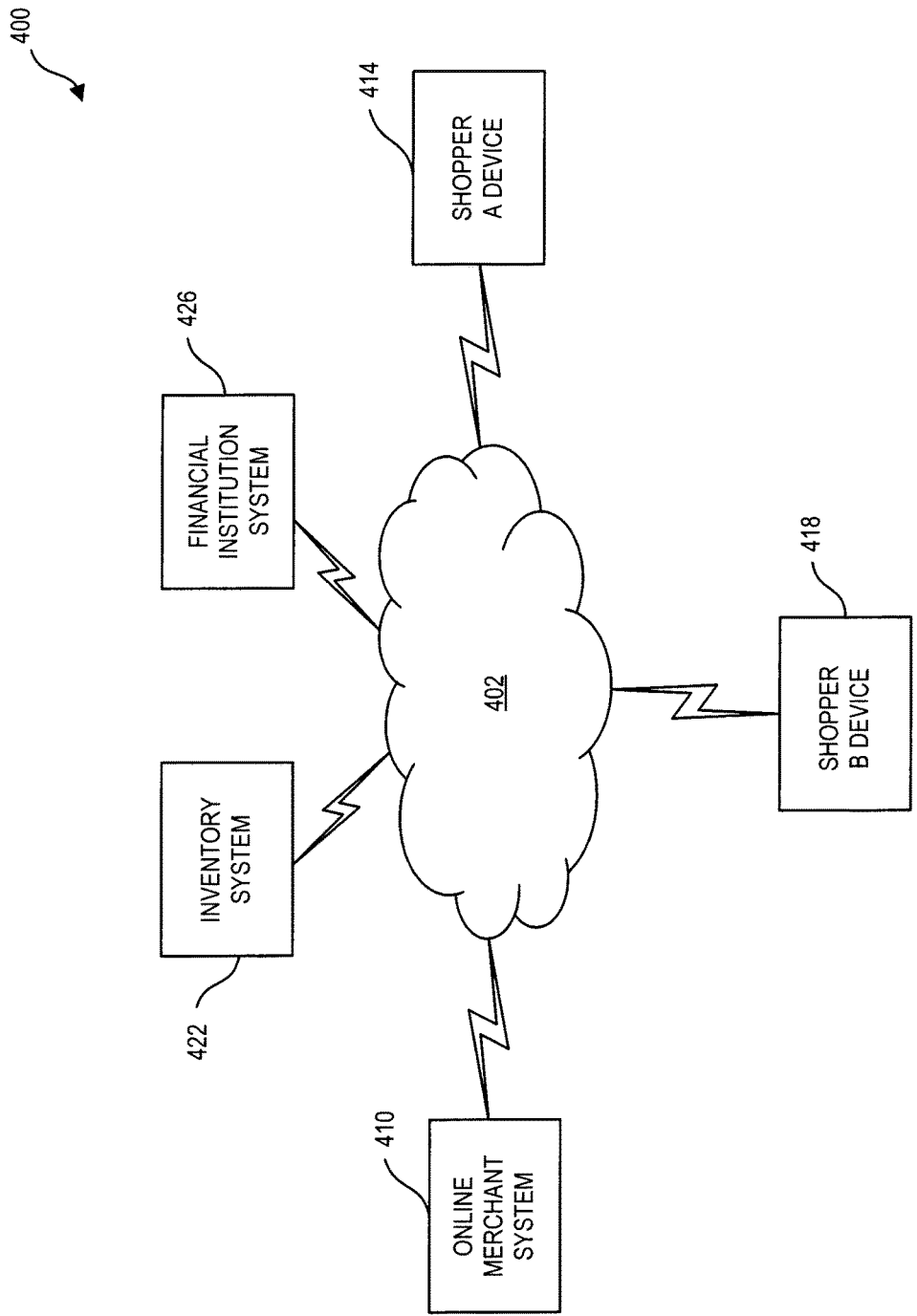
FIG. 4 is a block diagram of a system in accordance with an embodiment as set forth herein.

FIG. 4 is a block diagram of a system 400, in accordance with an embodiment as set forth herein. In the embodiment of FIG. 4, system 400 includes numerous devices, which may be or include computing nodes 100 as previously described, connected by a network 402. For example, network 402 may be a physical network or a virtual network. A physical network can be, for example, a physical telecommunications network connecting numerous computer nodes or systems, such as computer servers and computer clients. By contrast a virtual network can, for example, combine numerous physical networks or parts thereof into a logical virtual network. In another example, numerous virtual networks can be defined over a single physical network.

By way of explanation, FIG. 4 depicts an example environment. In one embodiment, system 400 can include an online merchant system 410, first shopper (shopper A) device 414, second shopper (shopper B) device 418, an online merchant system 410, inventory system 422 and financial institution system 426. One or more program 440 which can run on one or more computing node 100 of merchant system 410 can obtain information transmitted to merchant system 410.

Regarding first shopper device 414 (shopper A device), device 414 in one embodiment can include a computing node 100 provided by a client computer, e.g. a mobile device such as a mobile cellular phone, laptop or PC that runs one or more program including a web browser for browsing web pages.

Regarding second shopper device 418 (shopper B device), device 418 in one embodiment can include a computing node 100 provided by a client computer, e.g. a mobile device such as a mobile cellular phone, laptop or PC that runs one or more program including a web browser for browsing web pages.

Regarding merchant system 410, merchant system 410 in one embodiment can include a computing node 100 provided by a web server that serves web pages providing an online purchasing environment.

Figure 5:
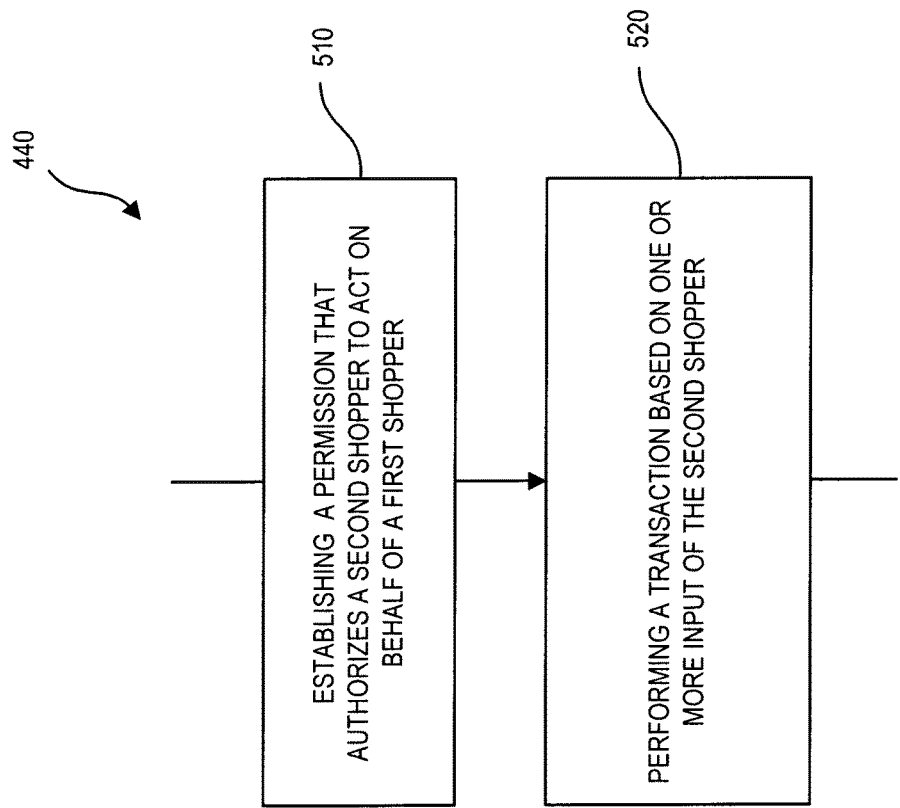
FIG. 5 is a flow diagram illustrating a method in accordance with an embodiment as set forth herein.

FIG. 5 is a flow diagram illustrating a method, in accordance with one or more aspects set forth herein. By way of example, the method described with respect to FIG. 5 can be performed using one or more program 440 running on one or more device e.g., of online merchant system 410 (FIG. 4) having one or more computing node 100 as described with respect to FIG. 3. In one embodiment, one or more program 440 can provide the functionality of first shopper to second shopper permission processing 96.

In the embodiment of FIG. 5, one or more program 440 at block 510 can perform establishing a permission that authorizes a second shopper to act on behalf of a first shopper, the first shopper having a profile that includes first shopper information stored in a secure computing environment; and at block 520 the method of FIG. 5 can include performing a transaction based on one or more input of the second shopper, the transaction using content of the first shopper information.

In one embodiment, the permission of block 420 can be a limited permission that restricts one or more of the following selected from the group consisting of: (a) a time period in which the second shopper is authorized to act on behalf of the first shopper, (b) a number of transactions that can be performed, (c) specific one or more goods that can be purchased, (d) one or more type of goods that can be purchased, and (e) information of a confidential registered user profile that can be accessed by the second shopper. Confidential registered user information can include e.g., username, password, financial institution account information, social security number, shipping address, and the like. It can be helpful to restrict the second shopper's access to a shipping address associated with the first shopper so that the second shopper cannot circumvent the protections of system 400 by shipping a product to, for example, himself/herself or another destination that is different from a destination that is approved by the first shopper, as may be indicated in the first shopper's profile, which includes, but is not limited to, data and settings.

In one embodiment one or more program 440 can be operative so that one or more restriction on a permission can be user configurable, e.g. one or more program 440 can establish a permission based on a user configurable permission request. However, in one embodiment, one or more restriction may be a default restriction that is not configurable.

In one embodiment one or more program 440 can be operative to present the first shopper with a user interface that allows the first shopper to define one or more parameter of the permission.

In one embodiment, one or more program 440 can run one or more computer node 100 of online merchant system 410. In such embodiment, the establishing at block 510 and performing at block 520 can be performed by an on-line merchant system.

In one embodiment, the performing at block 520 can be conditional on obtaining a secure token from the second shopper, wherein the secure token has been generated in response to a permission obtained from the first shopper.

In one embodiment, one or more program 440 can send a message to the first shopper in response to a message obtained from the second shopper. For example, one or more program 440 running on online merchant system 410 can obtain a message from shopper B device 418 indicating that shopper B wishes to present an order on behalf of shopper A. In response to such message one or more program 440 can send a message to shopper A device 414 indicating that shopper B wishes to place an order on behalf of shopper A.

In one embodiment, one or more program 440 can send a message to the first shopper (shopper A) in response to a message obtained from the second shopper (shopper B), wherein the message to the first shopper includes content of the message obtained from the second shopper.

Figure 6A:
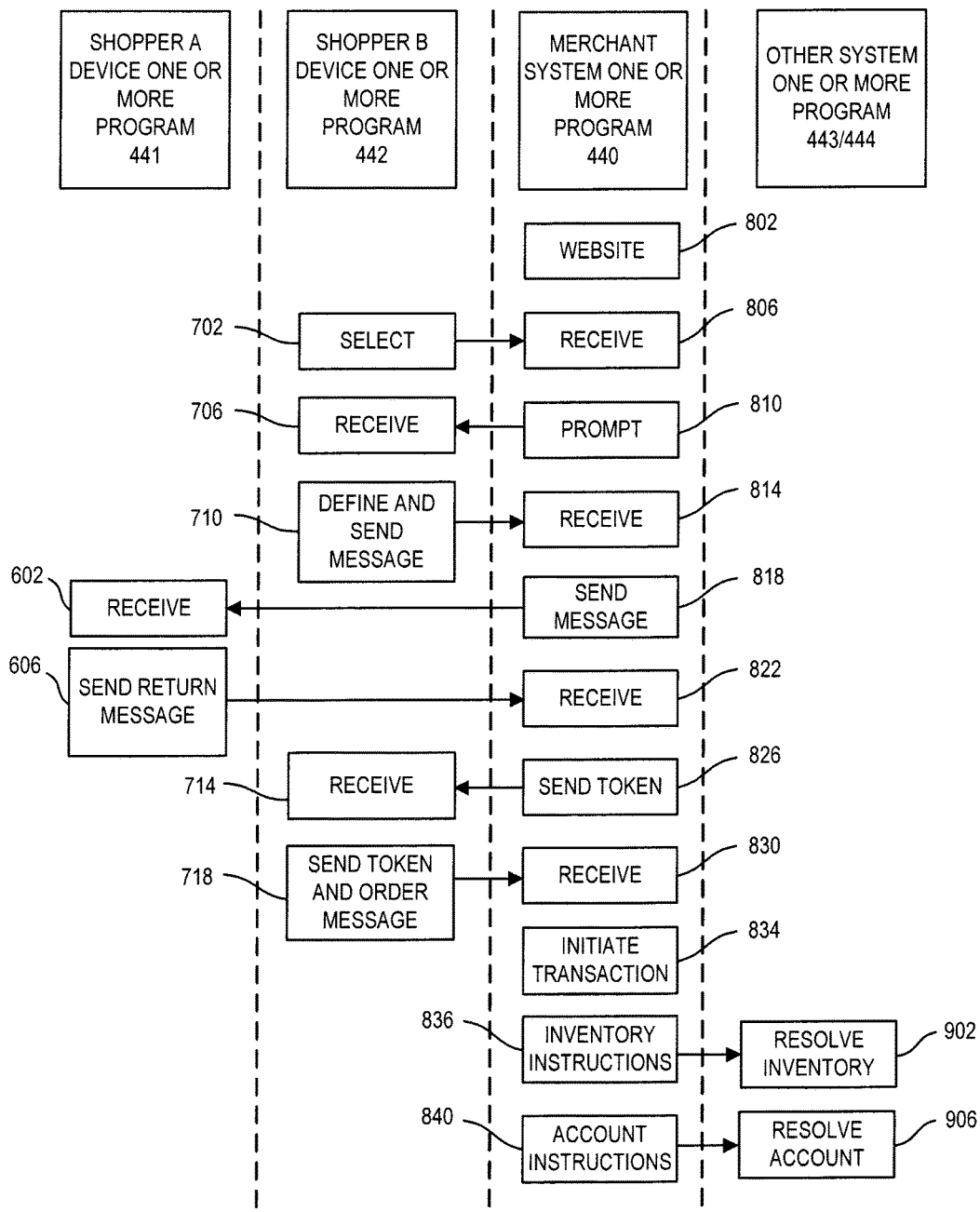
FIGS. 6A-6B are a flow diagram illustrating further aspects of a method in which a first shopper grants permission to a second shopper to order a transaction on behalf of a first shopper.
Figure 6B:
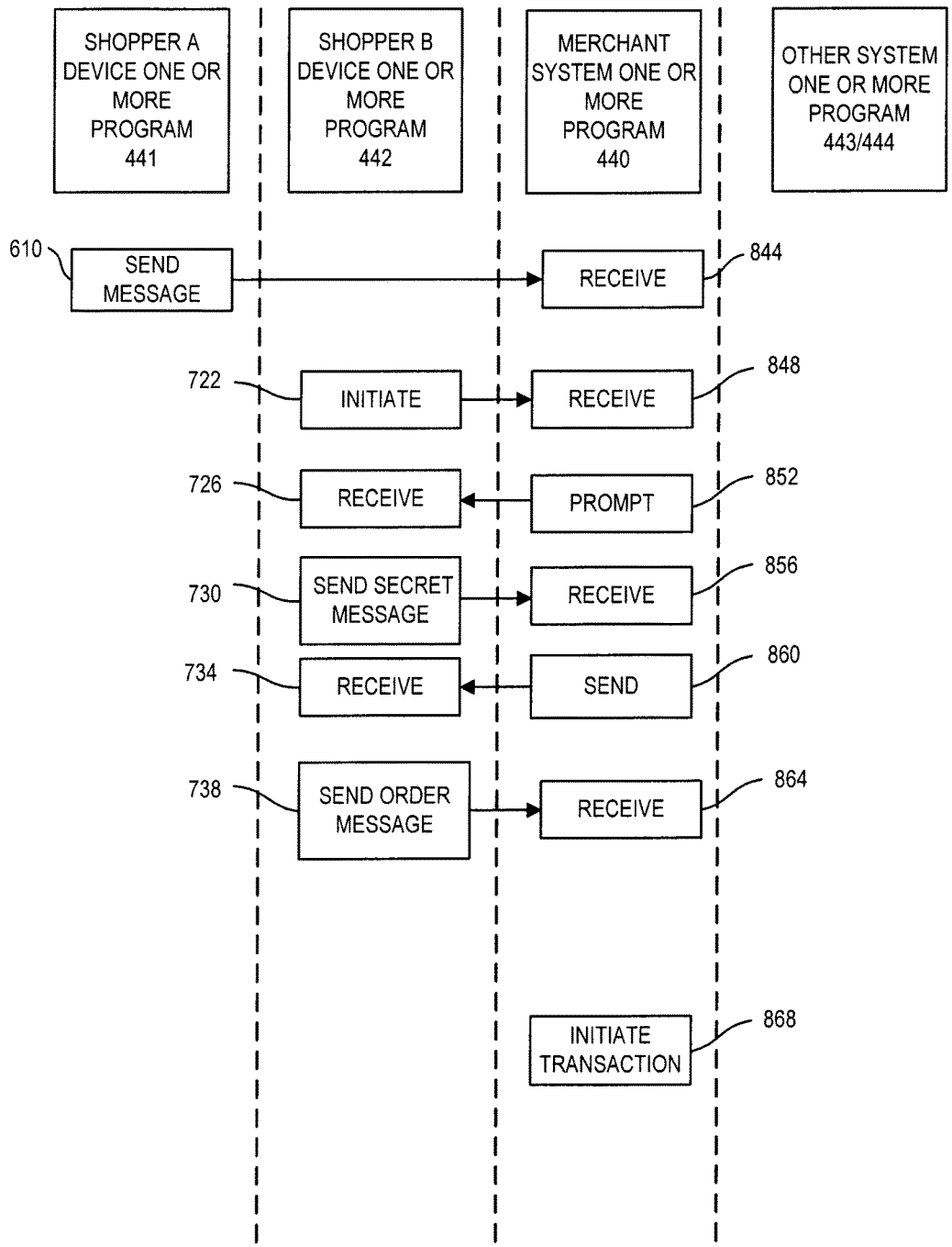

FIGS. 6A-6B are a flow diagram illustrating further aspects of a method for managing a permission in accordance with an embodiment as set forth herein. By way of explanation in FIGS. 6A-6B method elements are illustrated from the point of view of a merchant system one or more program 440 (e.g., running on online merchant system 410 of FIG. 4), shopper A one or more program 441 e.g. running on shopper A device 414 or FIG. 4, shopper B one or more program 442 e.g. running on shopper B device 418 or FIG. 4, and other system one or more programs, e.g. one or more program 443 running on inventory system 422 and one or more program 444 running on financial institution system 426.

While the flow diagram of FIGS. 6A-6B depicts a relatively distributed computing environment, any distribution scheme for functions corresponding to those described in reference to the flow diagram of FIGS. 6A-6B can be selected. In one embodiment, functions corresponding to all of the functions described in reference to the flow diagram of FIGS. 6A-6B can be performed by one or more program, e.g., one or more program 440 running on a single computing node 100 (FIG. 3).

In one embodiment, some or all of the one or more program 440, 441, 442, 443, 444 may run on a different collection of physical or virtual machines or processors, depending on the need for scalability of the system. In one embodiment, each of the one or more program 440, 441, 442, 443, 444 can run on a different computer node 100. In one specific example, each of the one or more program 440, 441, 442, 443, 444 can run on a single multi-processor computer system. In one specific example, each of the one or more program 440, 441, 442, 443, 444 can run on a single single-processor computer system. In another specific example, various portions of online merchant system one or more program 440 may run on different processors running on different computing nodes 100. In another specific example, various portions of one or more program 441 may run on different processors running on different computing nodes 100. In another specific example, various portions of one or more program 442 may run on different processors running on different computing nodes 100. In another specific example, various portions of one or more program 443 may run on different processors running on different computing nodes 100. In another specific example various portions of one or more program 444 can run on different processors running on different computing nodes 100.

By way of overview, FIGS. 6A-6B illustrates, at least in part, one or more embodiment in which a first shopper can define a permission on which a permission can be established to permit second shopper.

Figure 7:
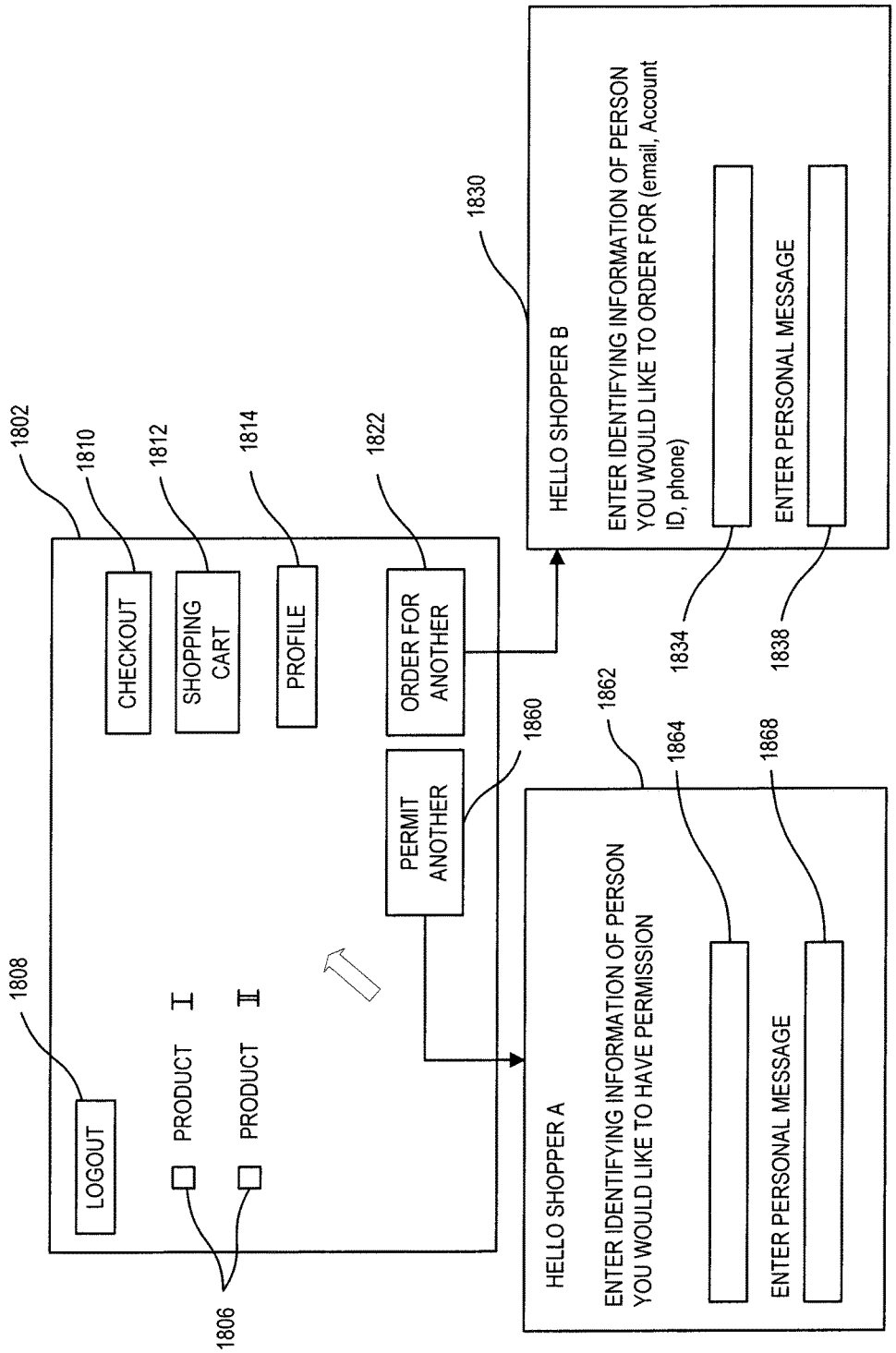
FIG. 7 a illustrating user interface allowing a second shopper to indicate that second shopper would like to perform an order on behalf of a first shopper.

In one embodiment, at block 802 merchant system one or more program 440 can make available a website e.g. a website offering items for purchase and allowing online checkout of items for purchase. An illustrative user interface 1802 website webpage for display that may be made available at block 802 in one embodiment is shown in FIG. 7. User interface 1802 which can be rendered viewable at shopper B device 418 by a browser of one or more program 442 running on shopper B device 418 can include various buttons such as product selection buttons 1806, login button 1808, checkout button 1810, profile button 1814 and order for another button 1822 which allows a person viewing the one or more webpage, e.g. shopper B at shopper B device 418 webpage to commence a process for ordering for another.

At block 702 one or more program 442 can send a message to one or more program 440 to select functionality associated with button 1822 based on a user (shopper B) of shopper B device 418 selecting button 1822. In response, one or more program 440 can present user interface 1830 (FIG. 7) provided by a webpage window prompting entry of content by the user of shopper B device 418 (FIG. 4). At block 810 one or more program 440 by presentment of user interface 1830 e.g. provided by a webpage window opened by a browser of one or more program 442 running on shopper B device 418 can prompt for entry of one or more verification information item, e.g. one or more of an email address, an account number or a mobile cellular phone number.

At block 710 one or more program 442 based on one or more input entered into user interface 1830 can define and send a message. The message sent at block 710 can include the prompted for entry of one or more verification information item, e.g. one or more of an email address, an account number or a mobile cellular phone number. Such information can be entered into field 1834. The message can also include, e.g., a personal message to shopper A about an order. The personal message (which as set forth herein will be read by person A) can give confidence to shopper A that shopper B (which is known to A) authored the message. Personnel message information can be entered into field 1838.

At block 818 one or more program 440 can send a message to shopper A one or more program 441 for receipt by one or more program 441 at block 602. The message sent at block 818 can include content of the message sent at block 710, e.g., the personal message sent at block 710 so that shopper A at device 414 (FIG. 4) has confidence that shopper B authored the message. The message sent at block 818 can cause a user interface e.g. provide by a webpage window to open allowing shopper A to in one embodiment to return a permission request and to define parameters of a permission request. The message sent at block 818 in one embodiment can include a link to the one or more webpage of the online merchant system 410 to be opened by a browser of one or more program 441 that shopper A at shopper A device 414 can view the one or more webpage, which can include a user interface window allowing shopper A to define a permission request on which a permission established by one or more program 440 can be based to permit shopper B to place an order on behalf of shopper A.

One or more program 440 running on merchant system 410 in one embodiment can be operative so that all communications between one or more program 440 and one or more program 441 running on shopper A device 414 and all communications between one or more program 440 and one or more program 442 running on shopper B device can be secure socket layer (SSL) communications, i.e. messages in accordance with an SSL communication protocol (SSL messages). Providing communications to be in accordance with an SSL communication protocol provides additional assurances that sent and received messages will not be intercepted an unscrupulous third party.

In addition one or more program 440 can authenticate one or more of shopper A and shopper B. In one embodiment, shopper A and shopper B can be registered user of merchant system 410 and may have previously logged into merchant system 410 prior to access of the permission processing functions set forth herein. One or more program 440 in one embodiment can authorize transactions based on permission requests obtained and based on authentications of shopper A and shopper B.

In one embodiment online merchant system 410 can include increased processing resources relative to shopper A device 414 and shopper B device 418, as measured e.g. by response time, processing speed, channel capacity, latency, bandwidth, and/or throughput. Online merchant system 410 with its increased processing resources relative to shopper A device 414 and shopper B device 418 can include increased security provisioning capabilities relative to shopper A device 414 and shopper B device 418.

Figure 8:
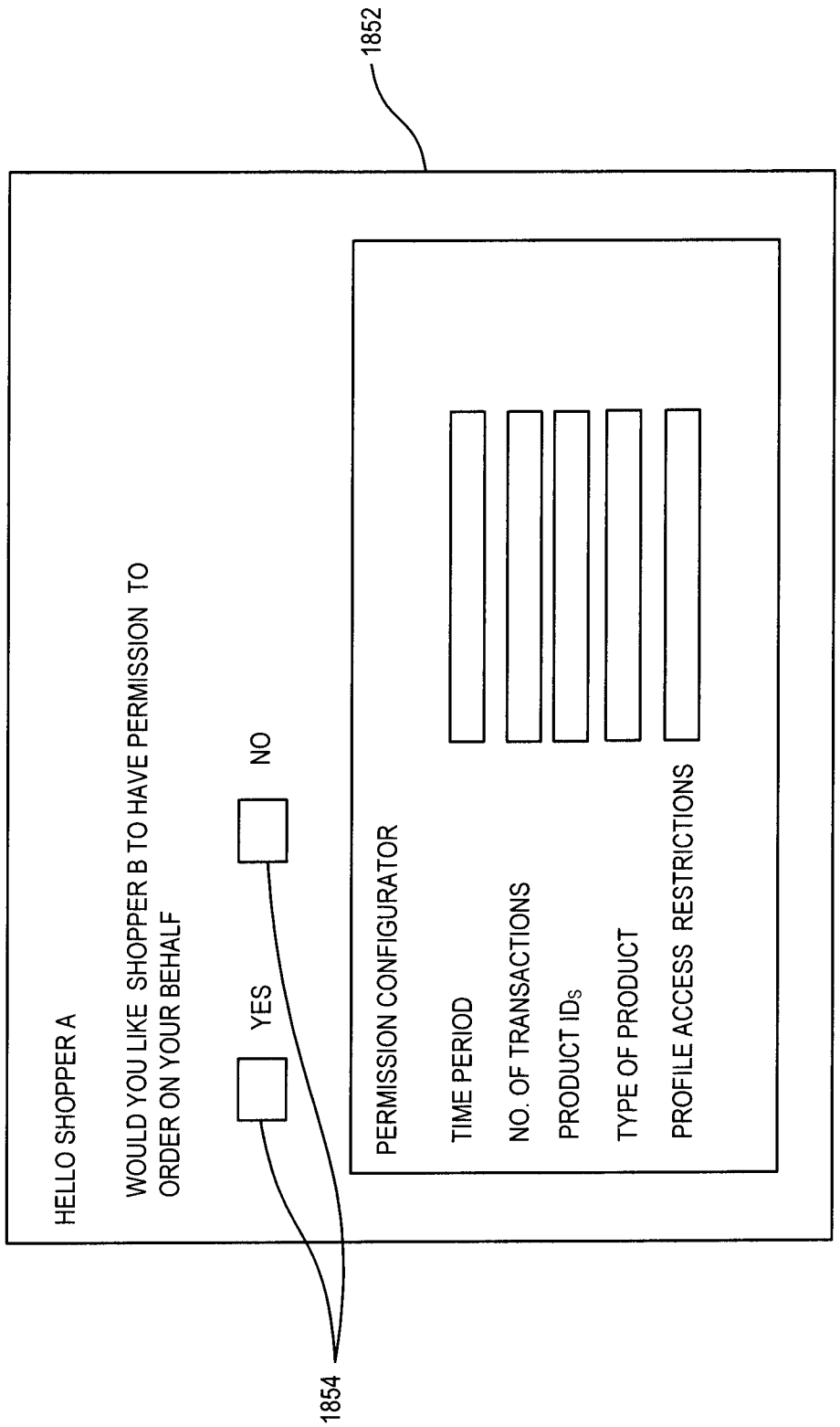
FIG. 8 illustrates a user interface allowing a first shopper to grant permission to a second shopper to perform an order on behalf of the first shopper and to define one or more restriction on the permission.

An embodiment of a user interface 1852 allowing shopper A to define a permission request on which a permission can be established to permit to shopper B to order on shopper A's behalf and to define parameters of a permission request is shown in FIG. 8. User interface 1852 in one embodiment can be provided by a website that serves user interface webpages and webpage windows as set forth in reference to FIG. 7. In the embodiment illustrated with reference to the user interface 1852 of FIG. 8 shopper A can define a permission request using the indicated YES box of the YES/NO boxes 1854 and can define one or more restriction on a permission request such as: (a) a time period in which the second shopper is authorized to act on behalf of the first shopper, (b) a number of transactions that can be performed, (c) specific one or more product that can be purchased (e.g. by designating one or more product ID), (d) one or more type of goods that can be purchased, and (e) information of shopper A's profile that can be accessed by shopper B. In the embodiment illustrated with reference to the user interface 1852 of FIG. 8 shopper A can define a denial request using the indicated NO box of the YES/NO boxes 1854.

At block 606 one or more program 441 can send a return message to one or more program 440. The return message can include a permission request that can be used by one or more program 440 e.g. running on online merchant system 410 to establish a permission to permit shopper B placing an order on behalf of shopper A. The return message can include a denial request that can be used by one or more program 440 e.g. running on online merchant system 410 to deny a permission so that shopper B can be denied placing an order on behalf of shopper A. The return message can include additional information such as parameters that define one or more restriction to a permission request as set forth herein such as one or more of (a) a time period in which the second shopper is authorized to act on behalf of the first shopper, (b) a number of transactions that can be performed, (c) specific one or more product that can be purchased (d) one or more type of goods that can be purchased, or (e) information of the profile that can be accessed by the second shopper.

In some embodiments one or more program 440 at block 818 can provide security protections in addition to or in place of those provided by one or more program 440 requiring shopper A to define a permission request or denial request, e.g. with YES/NO boxes 1854 shown in FIG. 8. In one embodiment, one or more program 440 at block 818 can present the YES/NO permission request or denial request option to shipper A device 414 for viewing and use by shopper A for only a limited time period, e.g., 1 minute, N minutes. In one embodiment, one or more program 440 at block 818 can present to shopper A e.g. via user interface 1852 one or more challenge query e.g. to return the last 4 digits of his/her social security number or his/her zip code or his/her birthdate or the like. In one embodiment, one or more program 440 at block 818 a customer service representative of merchant system 410 at a time determined by merchant system 410 can call shopper A e.g. using a mobile cellular phone and request shopper A to return e.g. the last 4 digits of his/her social security number or his/her zip code or his/her birthdate or the like.

Responsively to receipt of a message at block 822 including a permission request and defining one or more restriction, one or more program 440 e.g. running on online merchant system 410 can establish a permission permitting shopper B to place an order on behalf of shopper A based on the permission request received at block 822 including any defined one or more restriction. One or more program 440 can establish a permission according to the permission request received at block 822 including any defined one or more restriction included with the permission request. At block 826 one or more program 440 on examining a permission request received at block 822 can responsively send a secure token to one or more program 442 which secure token can be received by one or more program 442 at block 714. A secure token can be a magic string generated by online merchant system 410 to uniquely identify the current browsing session between shopper A device 414 and merchant system 410 and/or between shopper B device 418 and merchant system 410. With increased processing resources relative to device 414 and device 418 in one embodiment, merchant system 410 can generate a secure token that can be extremely difficult to guess by a third party.

At block 718 one or more program 442 running on shopper B device 418 can send the token received at block 718 to one or more program 440. The secure token sent at block 718 can be sent based on one or more input entered into a user interface displayed on shopper B device 414 by one or more program 442 (e.g. which can be provided by user interface 1802). In one embodiment, shopper A device 414 based on one or more input of shopper A can generate a secure token. However configuring merchant system 410 to generate a secure token in some embodiments can leverage the increased computational power of merchant system 410 which is present in one embodiment. In one embodiment, shopper A device 414 based on one or more input of shopper A can send a secure token to shopper B device 418. However configuring merchant system 410 to send a secure token e.g. at block 826 can leverage the increased capacity of merchant system 410 to provide secure SSL communications which is present in one embodiment.

Together with the token sent at block 718 one or more program 442 can send a place order message at block 718 defining place order details based on one or more input entered by shopper B into a user interface displayed by one or more program 442 on shopper B device 418 (FIG. 4). The output user interface can be user interface 1802 (FIG. 7) with product selection buttons 1806 allowing selection of a product and checkout button 1810 allowing activation of a checkout procedure. User interface 1802 can include functionally so that checkout functions accessed by product and checkout button 1810 recognize shopper B as a shopper ordering for shopper A. On accessing such functionality shopper B having permission to act on behalf of shopper A can be enabled using shopper B device 418 to place an order e.g. by browsing for goods, adding goods to an online shopping cart for selection of goods. Selected goods can be paid for from shopper A's account. However, as set forth herein shopper B's ability to define terms of placed order on behalf of shopper A may be restricted relative to shopper's A ability to place an order on behalf of shopper A. For example, shopper B using shopper B device 418 may be restricted from viewing and/or changing a shipping address in accordance with a permission established by one or more program 440 based on a permission request defined by and obtained from shopper A as set forth herein. In such manner shopper B can be restricted from "shipping goods to himself/ herself" or otherwise physically intercepting the ordered goods.

One or more program 440 at block 834 can examine the received token received at block 830 and on positive examination can authorize an initiate transaction ordered by shopper B at block 718 in accordance with the place order information defined and sent at block 718.

One or more program 440 can perform a transaction including by sending at block 836 inventory instructions to one or more program 443 running on inventory system 422 (FIG. 4) and at block 840 send account instructions to one or more program 444 running on financial institution system 426 (FIG. 4) at block 840. In response to the inventory instructions one or more program 443 running on inventory system 422 can appropriately update inventory and establish shipping orders. In response to the account instructions one or more program 444 running on financial institution system 426 can appropriately update an account balance. One or more program 440 can perform digital rights allocation based on a permission request obtained from a first shopper. Digital rights that can be allocated can include e.g. a permission to shopper B to place an order on behalf on shopper A. Digital rights that can be allocated can include e.g. one or more restriction on a permission to shopper B to place an order on behalf on shopper A as set forth herein.

In one embodiment prior to block 702 each of shopper A and shopper B may have previously registered as registered users of merchant system 410 using an online user registration process. In performing such registrations merchant system 410 may have acquired certain confidential profile information from shopper A and shopper B such as payment information (account numbers of the one or more financial institution that purchases can be paid from), home address information, email address, phone number, shipping address information, and history of transactions. Merchant system 410 can store such confidential profile information in a secure computing environment characterized by e.g. physically isolated data storage, encrypted data storage, one or more software firewall, and/or one or more hardware firewall.

In one embodiment, one or more program 440 can be operative so that shopper A can define a permission request for permitting shopper B to act on shopper A's behalf without shopper B previously requesting such permission request. An example of such embodiment is set forth herein below.

Referring to the flow diagram of FIG. 6A-6B, one or more program 441 at block 610 can send a secret message based on one or more input entered at shopper A device 414 to one or more program 440 that receives the secret message at block 844. For example, referring to FIG. 7 one or more webpage served by one or more program 440 can present user interface 1862 provided by a window opened by a browser program of one or more program 441. User interface 1862 can be accessed by shopper A clicking on "permit another" button 1860 of user interface 1802 as shown in FIG. 7 which allows shopper A to initiate a process to permit shopper B to act on behalf of shopper A. In field 1864 shopper A can enter identifying information of shopper B, e.g. email address, user account ID, mobile cellular phone number, etc. In field 1868 shopper A can enter a secret message, e.g. a text message or a voice print (short voice audio clip).

Sometime later at block 722 shopper B may initiate a process to place an order on shopper A's behalf, e.g. by clicking button 1822 of user interface 1802 (FIG. 7). On receipt of an initiate message at block 848 one or more program 440 can present user interface 1830 (FIG. 7) prompting shopper B to enter identifying information for shopper B, e.g. email address, user account ID, phone number, etc. within field 1834. User interface 1830 can be displayed on shopper B device 418 by a browser of one or more program 442 running on shopper B device 418. One or more program 440 with user interface 1830 can prompt shopper B to enter within field 1838 of user interface 1830 the secret message sent by shopper A device 414 based on one or more input of shopper A at block 610. One or more program 442 can send the secret message with the identification information based the one or more input of shopper B at block 730. For entry of the secret message shopper A and shopper B may communicate e.g. via mobile cellular phone call or another communication channel external to merchant system 410 so that shopper B is made aware of the secret message entered by shopper A at block 610.

At block 856 one or more program 440 can receive the secret message sent at block 730 and can determine based on a matching criteria if there is a match between the secret message from shopper A device 414 at block 610 and the secret message sent from shopper B's device 418 at block 730. The secret message sent at block 730 need not be identical to the secret message sent at block 610 for one or more program 440 to determine that there is a match.

Responsively to determining there is a match, one or more program 440 can establish a permission permitting shopper B to place an order on behalf of shopper A and at block 860 can send a message to one or more program 442 running on shopper B device 418 indicating that one or more program 440 running on merchant system 410 has established a permission permitting shopper B to place an order on behalf of shopper A. The message sent at block 860 can be received by one or more program 442 running on shopper B device 418 at block 738. Shopper A can send a place order message at block 738 using a checkout function of user interface 1802 (FIG. 7) accessible via button 1810 (FIG. 7). On receipt of the place order message one or more program 440 can initiate the transaction per information of message sent at block 730. With the new order information one or more program 440 can perform the transaction in the manner described with reference to blocks 836 and 840 and inventory system 422 and financial institution system 426 can be resolved in the manner described with reference to blocks 902 and 906. In the embodiment described with reference to blocks 844-868 the message sent by one or more program 441 running on shopper A device 414 can serve as a permission request defined by shopper A. In one embodiment, user interface 1862 can include functionality described with reference to user interface 1852 allowing shopper A to define one or more restriction on a permission request such as: (a) a time period in which the second shopper is authorized to act on behalf of the first shopper, (b) a number of transactions that can be performed, (c) specific one or more product that can be purchased (e.g. by designating one or more product ID), (d) one or more type of goods that can be purchased, and (e) information of shopper A's profile that can be accessed by shopper B. Based on such one or more restriction one or more program 440 running on online merchant system 410 e.g. at block 856 can establish a permission to permit shopper B to place an order on behalf of shopper A based on the one or more restriction defined by shopper A using user interface 1862.

The terminology used herein is for the purpose of describing particular embodiments only and is not intended to be limiting. As used herein, the singular forms "a," "an," and "the" are intended to include the plural forms as well, unless the context clearly indicates otherwise. It will be further understood that the terms "comprise" (and any form of comprise, such as "comprises" and "comprising"), "have" (and any form of have, such as "has" and "having"), "include" (and any form of include, such as "includes" and "including"), and "contain" (and any form of contain, such as "contains" and "containing") are open-ended linking verbs. As a result, a method or device that "comprises," "has," "includes," or "contains" one or more steps or elements possesses those one or more steps or elements, but is not limited to possessing only those one or more steps or elements. Likewise, a step of a method or an element of a device that "comprises," "has," "includes," or "contains" one or more features possesses those one or more features, but is not limited to possessing only those one or more features. Forms of the term "based on" encompass relationships where an element is partially based on as well as relationships where an element is entirely based on. Forms of the term "defined by" encompass relationships where an element is partially defined by as well as relationships where an element is entirely defined by. Furthermore, a device or structure that is configured in a certain way is configured in at least that way, but may also be configured in ways that are not listed.

The corresponding structures, materials, acts, and equivalents of all means or step plus function elements in the claims below, if any, are intended to include any structure, material, or act for performing the function in combination with other claimed elements as specifically claimed. The description set forth herein has been presented for purposes of illustration and description, but is not intended to be exhaustive or limited to the form disclosed. Many modifications and variations will be apparent to those of ordinary skill in the art without departing from the scope and spirit of the disclosure. The embodiment was chosen and described in order to best explain the principles of one or more aspects set forth herein and the practical application, and to enable others of ordinary skill in the art to understand one or more aspects as described herein for various embodiments with various modifications as are suited to the particular use contemplated.

What is claimed is:

1. A system comprising:
a memory;
one or more processor in communication with the memory; and
program instructions executable by the one or more processor via the memory to perform a method, the method comprising:
establishing a permission that authorizes a second shopper to act on behalf of a first shopper, the first shopper having a profile that includes first shopper information stored in a secure computing environment; and
performing a transaction based on one or more input of the second shopper, the transaction using content of the first shopper information stored in a secure computing environment, wherein the second shopper is restricted from accessing one or more information item of the first shopper information stored in a secure computing environment, wherein the establishing a permission includes establishing a limited permission having at least one restriction, wherein method includes transmitting a first message to the first shopper in response to a security information message obtained from the second shopper, wherein the first message to the first shopper includes content of the security information message obtained from the second shopper, wherein the method includes presenting to the first shopper a first user interface that allows the first shopper to define a permission request, which permission request defined by the first shopper with use of the first user interface defines the at least one restriction, wherein the performing the transaction proceeds in response to obtaining a secure token from the second shopper, and wherein the secure token has been generated response to the permission request obtained from the first shopper defined by the first shopper with use of the first user interface, wherein the secure token has been generated by the one or more processor and sent to the second shopper in response to the permission request obtained from the first shopper defined by the first shopper with use of the first user interface, the one or more processor external to a device of the first shopper and a device of the second shopper, wherein the security information message received from the second shopper and the first message sent to the first shopper are secure socket layer (SSL) communications, wherein the first message having content of the security information message obtained from the second shopper causes opening the first user interface for use by the first shopper in response to receipt of the first message by a device of the first shopper, wherein the first message having content of the security information message obtained from the second shopper includes a webpage link which when opened by the device of the first shopper causes a webpage defining the first user interface to open.

2. The system of claim 1, wherein the at least one restriction restricts one or more of the following selected from the group consisting of: (a) a time period in which the second shopper is authorized to act on behalf of the first shopper, (b) a number of transactions that can be performed, (c) a specific one or more product that can be purchased (d) one or more type of goods that can be purchased, and (e) information of the first shopper's profile that can be accessed by the second shopper.

3. The system of claim 1, wherein the at least one restriction includes each of: (a) a time period in which the second shopper is authorized to act on behalf of the first shopper, (b) a number of transactions that can be performed, (c) a specific one or more product that can be purchased (d) one or more type of goods that can be purchased, and (e) information of the first shopper's profile that can be accessed by the second shopper.

4. The system of claim 1, wherein the at least one restriction restricts a time period in which the second shopper is authorized to act on behalf of the first shopper.

5. The system of claim 1, wherein the at least one restriction restricts a number of transactions that can be performed.

6. The system of claim 1, wherein the at least one restriction restricts a specific one or more product that can be purchased.

7. The system of claim 1, wherein the at least one restriction restricts one or more type of goods that can be purchased.

8. The system of claim 1, wherein the at least one restriction restricts information of the first shopper's profile that can be accessed the second shopper.

9. The system of claim 1, wherein the method includes presenting the second shopper with a second user interface that prompts the second shopper enter a secret message received from the first shopper.

10. A method comprising:
establishing a permission that authorizes a second shopper to act on behalf of a first shopper, the first shopper having a profile that includes first shopper information stored in a secure computing environment; and
performing a transaction based on one or more input of the second shopper, the transaction using content of the first shopper information stored in a secure computing environment, wherein the second shopper is restricted from accessing one or more information item of the first shopper information stored in a secure computing environment, wherein the establishing a permission includes establishing a limited permission having at least one restriction, wherein method includes transmitting a first message to the first shopper in response to a security information message obtained from the second shopper, wherein the first message to the first shopper includes content of the security information message obtained from the second shopper, wherein the method includes presenting to the first shopper a first user interface that allows the first shopper to define a permission request, which permission request defined by the first shopper with use of the first user interface defines the at least one restriction, wherein the performing the transaction proceeds in response to obtaining a secure token from the second shopper, and wherein the secure token has been generated response to the permission request obtained from the first shopper defined by the first shopper with use of the first user interface, wherein the secure token has been generated by one or more processor and sent to the second shopper in response to the permission request obtained from the first shopper defined by the first shopper with use of the first user interface, the one or more processor external to a device of the first shopper and a device of the second shopper, wherein the security information message received from the second shopper and the first message sent to the first shopper are secure socket layer (SSL) communications, wherein the first message having content of the security information message obtained from the second shopper causes opening the first user interface for use by the first shopper in response to receipt of the first message by a device of the first shopper, wherein the first message having content of the security information message obtained from the second shopper includes a webpage link which when opened by the device of the first shopper causes a webpage defining the first user interface to open.

11. The method of claim 10, wherein the at least one restriction restricts one or more of the following selected from the group consisting of: (a) a time period in which the second shopper is authorized to act on behalf of the first shopper, (b) a number of transactions that can be performed, (c) a specific one or more product that can be purchased (d) one or more type of goods that can be purchased, and (e) information of the first shopper's profile that can be accessed by the second shopper.

12. The method of claim 10, wherein the at least one restriction includes each of: (a) a time period in which the second shopper is authorized to act on behalf of the first shopper, (b) a number of transactions that can be performed, (c) a specific one or more product that can be purchased (d) one or more type of goods that can be purchased, and (e) information of the first shopper's profile that can be accessed by the second shopper.

13. The method of claim 10, wherein the at least one restriction restricts a time period in which the second shopper is authorized to act on behalf of the first shopper.

14. The method of claim 10, wherein the at least one restriction restricts a number of transactions that can be performed.

15. The method of claim 10, wherein the at least one restriction restricts a specific one or more product that can be purchased.

16. The method of claim 10, wherein the at least one restriction restricts one or more type of goods that can be purchased.

17. The method of claim 10, wherein the at least one restriction restricts information of the first shopper's profile that can be accessed the second shopper.

18. The method of claim 10, wherein the method includes presenting the second shopper with a second user interface that prompts the second shopper enter a secret message received from the first shopper.

19. A computer program product comprising:
a computer readable storage medium readable by one or more processing circuit and storing instructions for execution by one or more processor for performing a method comprising:
establishing a permission that authorizes a second shopper to act on behalf of a first shopper, the first shopper having a profile that includes first shopper information stored in a secure computing environment; and
performing a transaction based on one or more input of the second shopper, the transaction using content of the first shopper information stored in a secure computing environment, wherein the second shopper is restricted from accessing one or more information item of the first shopper information stored in a secure computing environment, wherein the establishing a permission includes establishing a limited permission having at least one restriction, wherein method includes transmitting a first message to the first shopper in response to a security information message obtained from the second shopper, wherein the first message to the first shopper includes content of the security information message obtained from the second shopper, wherein the method includes presenting to the first shopper a first user interface that allows the first shopper to define a permission request, which permission request defined by the first shopper with use of the first user interface defines the at least one restriction, wherein the performing the transaction proceeds in response to obtaining a secure token from the second shopper, and wherein the secure token has been generated response to the permission request obtained from the first shopper defined by the first shopper with use of the first user interface, wherein the secure token has been generated by the one or more processor and sent to the second shopper in response to the permission request obtained from the first shopper defined by the first shopper with use of the first user interface, the one or more processor external to a device of the first shopper and a device of the second shopper, wherein the security information message received from the second shopper and the first message sent to the first shopper are secure socket layer (SSL) communications, wherein the first message having content of the security information message obtained from the second shopper causes opening the first user interface for use by the first shopper in response to receipt of the first message by a device of the first shopper, wherein the first message having content of the security information message obtained from the second shopper includes a webpage link which when opened by the device of the first shopper causes a webpage defining the first user interface to open.

20. The computer program product of claim 19, wherein the at least one restriction restricts one or more of the following selected from the group consisting of: (a) a time period in which the second shopper is authorized to act on behalf of the first shopper, (b) a number of transactions that can be performed, (c) a specific one or more product that can be purchased (d) one or more type of goods that can be purchased, and (e) information of the first shopper's profile that can be accessed by the second shopper.

* * * * *